(12) United States Patent
Sajima et al.

(10) Patent No.: US 7,150,618 B2
(45) Date of Patent: Dec. 19, 2006

(54) MOLD FOR GOLF BALL

(75) Inventors: Takahiro Sajima, Kobe (JP); Seiichiro Endo, Kobe (JP)

(73) Assignee: SRI Sports Limited, Kobe (JP)

( * ) Notice: Subject to any disclaimer, the term of this patent is extended or adjusted under 35 U.S.C. 154(b) by 350 days.

(21) Appl. No.: 10/643,224

(22) Filed: Aug. 19, 2003

(65) Prior Publication Data

US 2004/0041297 A1 Mar. 4, 2004

(30) Foreign Application Priority Data

Sep. 3, 2002 (JP) ............................. 2002-257310

(51) Int. Cl.
| | |
|---|---|
| B29C 43/02 | (2006.01) |
| B29C 43/18 | (2006.01) |
| B29C 45/00 | (2006.01) |
| B29C 45/14 | (2006.01) |
| B29C 45/26 | (2006.01) |

(52) U.S. Cl. .................. 425/116; 264/162; 264/279.1; 264/320; 264/161; 425/408

(58) Field of Classification Search ............ 264/279.1, 264/320, 161, 162; 425/116, 120, 573, 408
See application file for complete search history.

(56) References Cited

U.S. PATENT DOCUMENTS

| | | | |
|---|---|---|---|
| 4,653,758 A | 3/1987 | Solheim | |
| 5,688,193 A | 11/1997 | Kasasima et al. | |
| 5,874,038 A | * 2/1999 | Kasashima et al. | ......... 264/279 |
| 6,123,534 A | 9/2000 | Kasashima et al. | |
| 6,685,456 B1 | * 2/2004 | Sajima | ....................... 425/116 |

FOREIGN PATENT DOCUMENTS

| | | | |
|---|---|---|---|
| JP | 62-47379 A | | 3/1987 |
| JP | 6-143349 A | | 5/1994 |
| JP | 8-173576 A | | 7/1996 |
| JP | 9-028833 A | | 4/1997 |
| JP | 11-137727 A | | 5/1999 |
| JP | 2002-159598 | * | 6/2002 |

* cited by examiner

*Primary Examiner*—Edmund H. Lee
(74) *Attorney, Agent, or Firm*—Birch Stewart Kolasch & Birch, LLP (57) ABSTRACT

A mold for a golf ball includes an upper portion (1) and a lower portion (3). A large number of projections (7) for dimple formation are provided on a cavity surface (5) of each of the upper portion (1) and the lower portion (3). A parting surface (8) of the upper portion (1) and the lower portion (3) has a concavo-convex shape. The parting surface (8) includes a first horizontal plane (13), a second horizontal plane (15) and an inclined surface (17). Circumferential central angles φ of the first horizontal plane (13) and the second horizontal plane (15) are 55 degrees or less. A total value Σφ of the circumferential central angles φ is 30 degrees to 330 degrees. An inclination angle α of the inclined surface (17) to a horizontal direction is 10 degrees to 60 degrees. A central angle θ between the horizontal planes (13) and (15) and an equator (E) is 1 degree to 8 degrees. A boundary corner portion of the horizontal planes (13) and (15) and the inclined surface (17) is subjected to rounding.

6 Claims, 12 Drawing Sheets

MOLD FOR GOLF BALL

This nonprovisional application claims priority under 35 U.S.C. § 119(a) on Patent Application No(s). 2002-257310 filed in JAPAN on Sep. 3, 2002, which is(are) herein incorporated by reference.

BACKGROUND OF THE INVENTION

1. Field of the Invention

The present invention relates to a mold for a golf ball. More particularly, the present invention relates to a mold comprising a large number of projections for forming a dimple on a cavity surface thereof.

2. Description of the Related Art

A golf ball has approximately 300 to 550 dimples on a surface thereof. The role of the dimples resides in one aspect that such dimples disturb an air stream around the golf ball during the flight to accelerate the transition of a turbulent flow over a boundary layer (which will be hereinafter referred to as a "dimple effect"). The acceleration of the transition of the turbulent flow causes a separating point of air from the golf ball to be shifted backwards so that a pressure resistance is reduced, resulting in an increase in the flight distance of the golf ball. The acceleration of the transition of the turbulent flow increases a differentia between upper and lower separating points of the golf ball which is generated by a back spin. Consequently, a lift acting on the golf ball is increased.

Usually, the golf ball is formed by a mold comprising upper and lower portions having hemispherical cavities respectively. Assuming that the upper cavity is the Northern Hemisphere of a globe and the lower cavity is the Southern Hemisphere of the globe, the upper and lower portions are joined to each other over an equatorial plane (a plane including an equator). The inner peripheral surface of the mold is provided with a large number of projections. By the projections, dimples are formed on the surface of the golf ball. The shape of the dimple is obtained by inverting the shape of the projection.

A molding material (for example, a synthetic resin) leaks out from the parting line of the upper and lower portions. Therefore, a spew is generated in the equator portion on the surface of the golf ball. The spew is ground and removed by means of a grindstone. When the spew is generated in the dimple, it is removed with difficulty. The dimple is not formed on the equator in order to easily remove the spew. More specifically, a projection is not provided on the parting line of the portions. Consequently, a great circle which does not cross the dimple, that is, a great circle path is formed on the surface of the golf ball. When the great circle path is coincident with a portion having the highest peripheral speed of a back spin (which will be hereinafter referred to as the "highest speed portion"), the sufficient dimple effect cannot be obtained and a flight distance is insufficient. Furthermore, in the case in which the great circle path and the highest speed portion are coincident with each other and the case in which they are not coincident with each other, the different dimple effects are obtained. Therefore, the aerodynamic symmetry of the golf ball is deteriorated. In some cases, the dimple provided in the vicinity of the great circle path is slightly deformed during the removal of a spew. If the deformation is caused, the dimple effect becomes more insufficient when the great circle path and the highest speed portion are coincident with each other.

Japanese Laid-Open Patent Publications Nos. Hei 6-143349 and Hei 11-137727 have disclosed a mold in which a pin for forming a dimple is provided on a parting surface. An arcuate spew is generated along a dimple in a golf ball formed by the mold. It is hard to remove the spew.

Japanese Laid-Open Patent Publication No. Hei 9-28833 has disclosed a mold in which a parting surface is formed by a plurality of inclined surfaces. In the mold, a perpendicular portion to a mold clamping direction is not present on the parting surface. In the mold, the parting surface is easily deformed by a mold clamping pressure.

Japanese Laid-Open Patent Publications Nos. Sho 62-47379 and Hei 8-173576 have disclosed a mold in which a parting line is concavo-convex shaped. In a golf ball obtained by the mold, a plurality of dimples are arranged in a first line of a seam corresponding to a parting line. Therefore, a sufficient dimple effect cannot be produced when the highest speed portion of a back spin is coincident with the seam.

Thus, all conventional molds for forming a golf ball in which a dimple is present on the equator have some defects. It is an object of the present invention to provide a mold which can obtain a golf ball having an excellent aerodynamic characteristic and is excellent in a durability.

SUMMARY OF THE INVENTION

A mold for a golf ball according to the present invention comprises upper and lower portions having a large number of projections for dimple formation on cavity surfaces thereof. Parts of the projections cross an equator. Each of the upper and lower portions has a plurality of horizontal planes and a plurality of inclined surfaces on a parting surface. A total value $\Sigma\phi$ of circumferential central angles $\phi$ of the horizontal planes is 30 degrees to 330 degrees. An inclination angle $\alpha$ of the inclined surface to a horizontal direction is 10 degrees to 60 degrees.

A dimple is present on the equator of the mold. Therefore, the equator of the golf ball obtained by the mold is not a great circle path. In the golf ball, a sufficient dimple effect can be produced even if the highest speed portion of a back spin is coincident with the equator. In the mold, a mold clamping pressure is received by the horizontal plane. The mold is excellent in a durability.

It is preferable that the circumferential central angle $\phi$ of the horizontal plane should be 55 degrees or less. In the golf ball obtained by the mold, a long smooth portion along a parting line is not present. The golf ball is excellent in an aerodynamic characteristic.

It is preferable that a central angle $\theta$ between the horizontal plane and the equator should be 1 degree to 8 degrees. The mold is more excellent in the durability.

It is preferable that a boundary corner portion between the horizontal plane and the inclined surface should be subjected to rounding. The mold is further excellent in the durability.

A method of manufacturing a golf ball according to the present invention comprises the following steps of:

(1) putting a material in a mold which includes upper and lower portions having a large number of projections on cavity surfaces thereof, each of the upper and lower portions having a plurality of horizontal planes and a plurality of inclined surfaces on a parting surface thereof, a sum $\Sigma\phi$ of circumferential central angles $\phi$ of the horizontal planes being 30 degrees to 330 degrees, and an inclination angle $\alpha$ of the inclined surface to a horizontal direction being 10 degrees to 60 degrees;

(2) forming a dimple having a shape obtained by inverting a shape of the projection through the projection; and (3) grinding and removing a spew formed by a material leaking out at the parting surface.

The golf ball obtained by the manufacturing method is excellent in the aerodynamic characteristic.

DESCRIPTION OF THE PREFERRED EMBODIMENTS

The present invention will be described below in detail based on a preferred embodiment with reference to the drawings.

Figure 1:
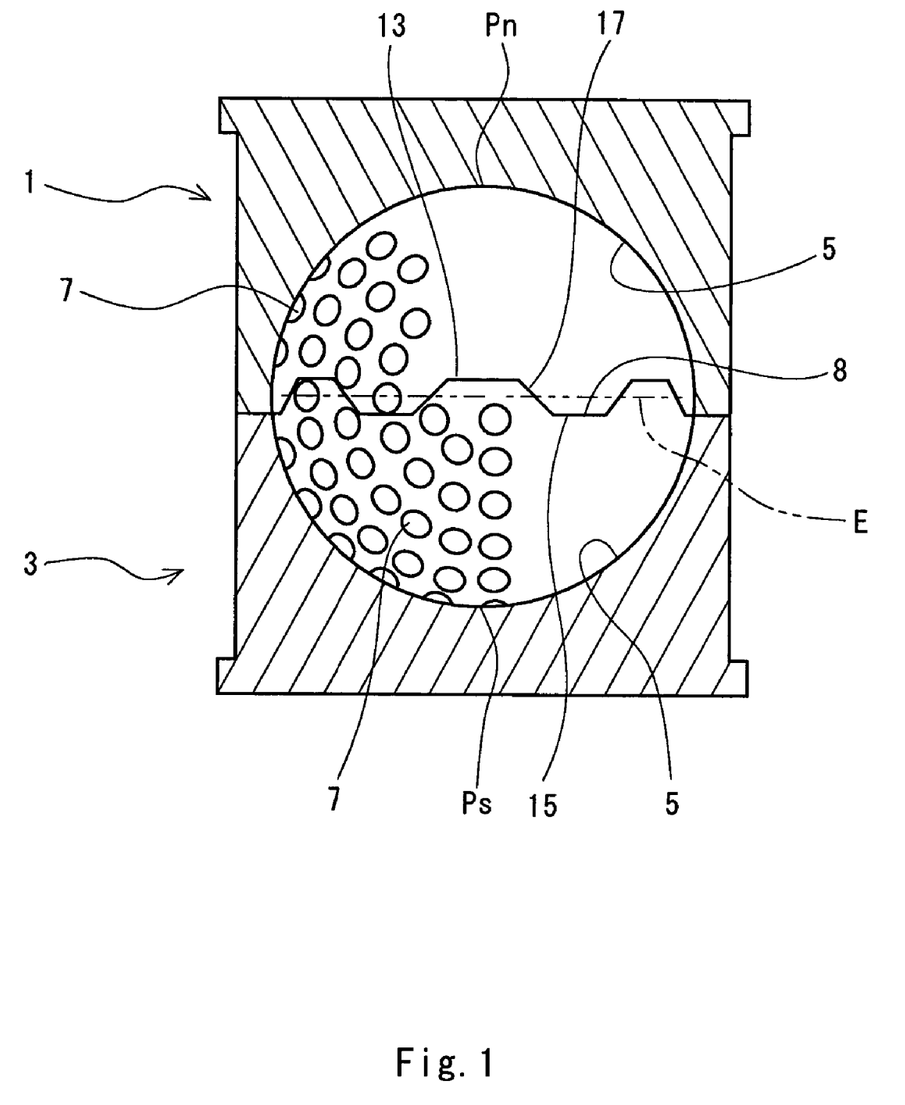
FIG. 1 is a sectional view showing a mold for a golf ball according to an embodiment of the present invention.

A mold for a golf ball shown in FIG. 1 comprises an upper portion 1 and a lower portion 3. By joining the upper portion 1 to the lower portion 3, a spherical cavity is formed. By the cavity, a golf ball is molded. A large number of projections 7 are provided on a cavity surface 5 of each of the upper portion 1 and the lower portion 3. The projection 7 has a circular contour. By the projection 7, a dimple is formed on the surface of the golf ball. In FIG. 1, only parts of the projections 7 are shown. Actually, the projections 7 are provided over the whole cavity surface 5.

The upper portion 1 comes in contact with the lower portion 3 at a parting surface when they are clamped. As is apparent from FIG. 1, the parting surface 8 of the upper portion 1 and the lower portion 3 has a concavo-convex shape. In FIG. 1, a two-dotted chain line indicated as E is an equator in which the uppermost portion of the cavity surface 5 of the upper portion 1 is assumed to be a north pole Pn of a globe and the lowermost portion of the lower portion 3 is assumed to be a south pole Ps of the globe. A plane including the equator E is an equatorial plane. Parts of the projections 7 cross the equator E.

Figure 2:
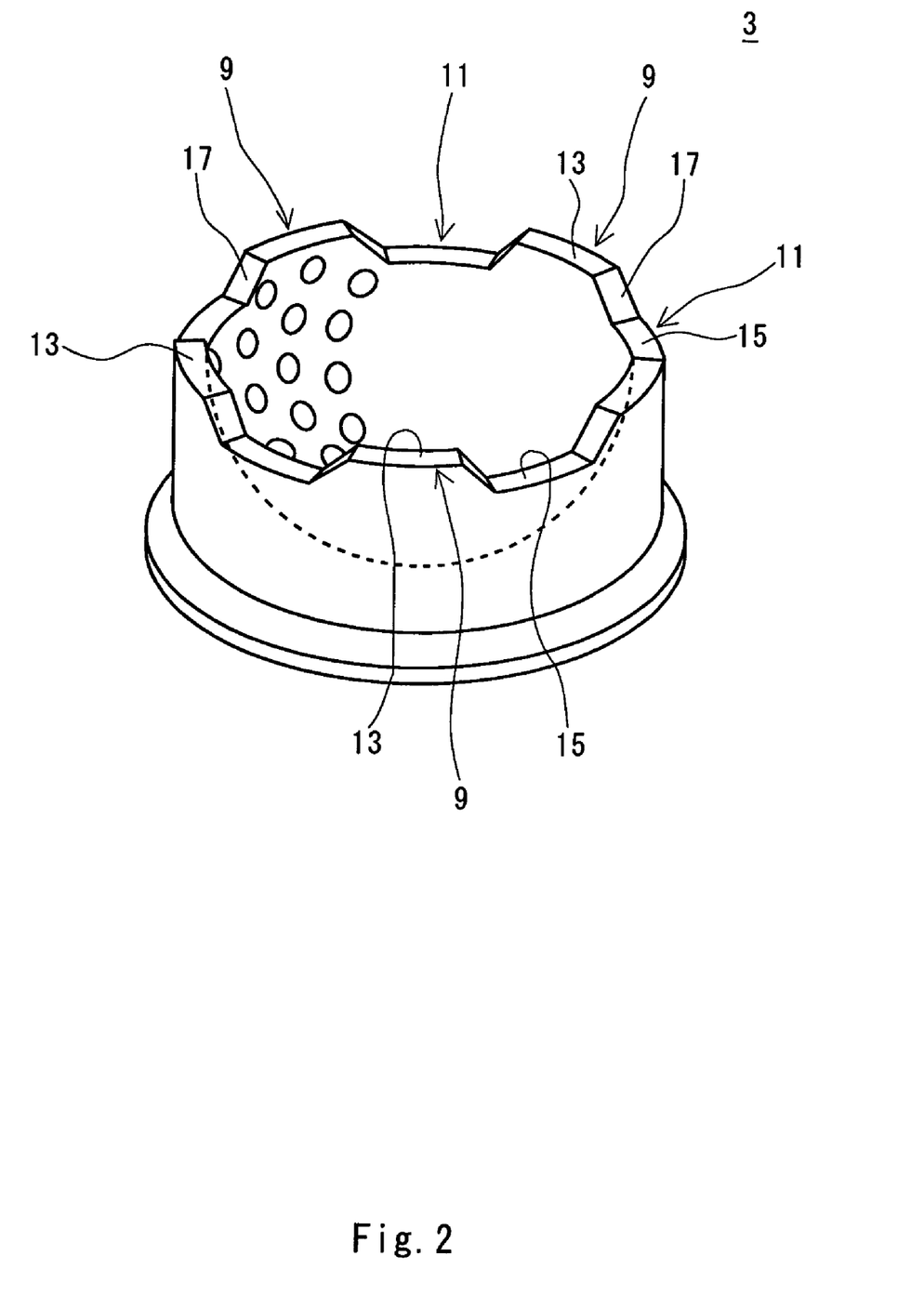
FIG. 2 is a perspective view showing the lower portion of the mold in FIG. 1.

FIG. 2 is a perspective view showing the lower portion 3 of the mold in FIG. 1. The lower portion 3 includes five convex portions 9 and five concave portions 11. The convex portion 9 is protruded from the equator E. The concave portion 11 is recessed from the equator E. The convex portion 9 and the concave portion 11 are alternately provided. The upper portion 1 also includes five convex portions 9 and five concave portions 11, which is not shown. The convex portion 9 of the lower portion 3 is fitted in the concave portion 11 of the upper portion 1, and the convex portion 9 of the upper portion 1 is fitted in the concave portion 11 of the lower portion 3. By the fitting, the spherical cavity is formed as described above and the parting surface 8 of the upper portion 1 and the lower portion 3 has a concavo-convex shape.

As described above, the convex portion 9 and the concave portion 11 are alternately provided. In the lower portion 3, therefore, the number of the convex portions 9 is equal to that of the concave portions 11 (five in this example). The convex portion 9 of the lower portion 3 is fitted in the concave portion 11 of the upper portion 1. Therefore, the number of the concave portions 11 of the upper portion 1 is equal to that of the convex portions 9 of the lower portion 3. The convex portion 9 of the upper portion 1 is fitted in the concave portion 11 of the lower portion 3. Therefore, the number of the convex portions 9 of the upper portion 1 is equal to that of the concave portions 11 of the lower portion 3. More specifically, in the mold, the numbers of the convex portions 9 of the upper portion 1, the concave portions 11 of the upper portion 1, the convex portions 9 of the lower portion 3 and the concave portions 11 of the lower portion 3 are equal to each other.

In the lower portion 3, the parting surface 8 includes a first horizontal plane 13, a second horizontal plane 15 and an inclined surface 17. The first horizontal plane 13 is present in the convex portion 9 and is substantially parallel with the equatorial plane. The second horizontal plane 15 is present in the concave portion 11 and is substantially parallel with the equatorial plane. The inclined surface 17 is positioned between the first horizontal plane 13 and the second horizontal plane 15. The inclined surface 17 is inclined with respect to the equatorial plane. In the lower portion 3, the inclined surface 17 has an upper half portion present in the convex portion 9 and a lower half portion present in the concave portion 11. In the lower portion 3, the first horizontal plane 13, the second horizontal plane 15 and the inclined surface 17 are planes and may be curved surfaces. The parting surface 8 of the upper portion 1 is also formed by the first horizontal plane 13, the second horizontal plane 15 and the inclined surface 17 in the same manner as the parting surface 8 of the lower portion 3.

Figure 3:
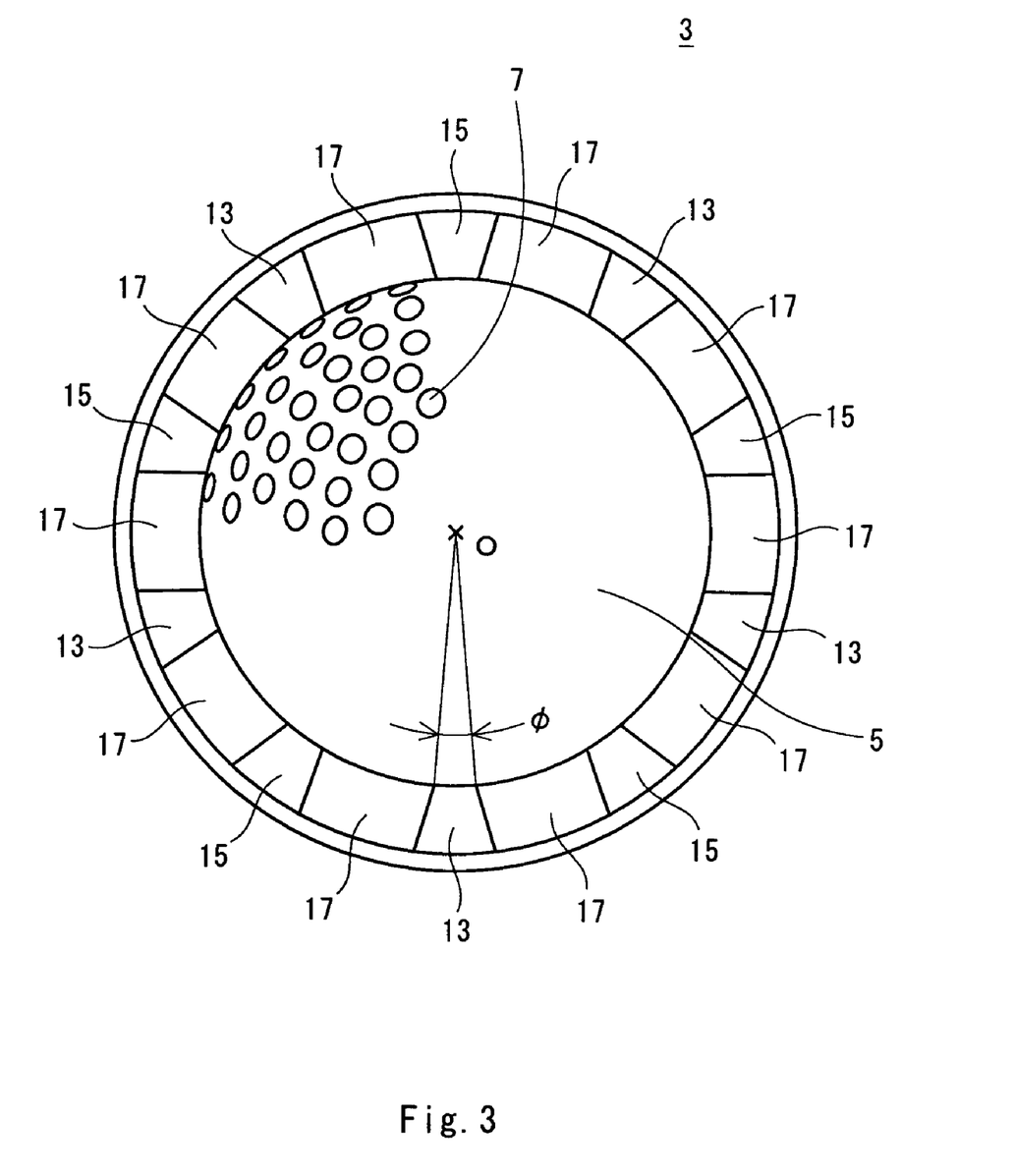
FIG. 3 is an enlarged plan view showing the lower portion in FIG. 2.

FIG. 3 is an enlarged plan view showing the lower portion 3 of FIG. 2. In FIG. 3, a point O is a center of a sphere of a cavity. The lower portion 3 includes five first horizontal planes 13, five second horizontal planes 15 and ten inclined surfaces 17. A mold clamping pressure is mainly received by the first horizontal plane 13 and the second horizontal plane 15. In the inclined surface 17, the mold clamping pressure acts in such a direction as to frictionally move the inclined surfaces 17. Therefore, there is a possibility that a boundary between the inclined surface 17 and the horizontal planes 13 and 15 might be worn out by the mold clamping pressure. The mold clamping pressure is received by the first horizontal plane 13 and the second horizontal plane 15 so that the wear-out can be suppressed. The mold including the horizontal planes 13 and 15 is excellent in a durability.

Figure 4:
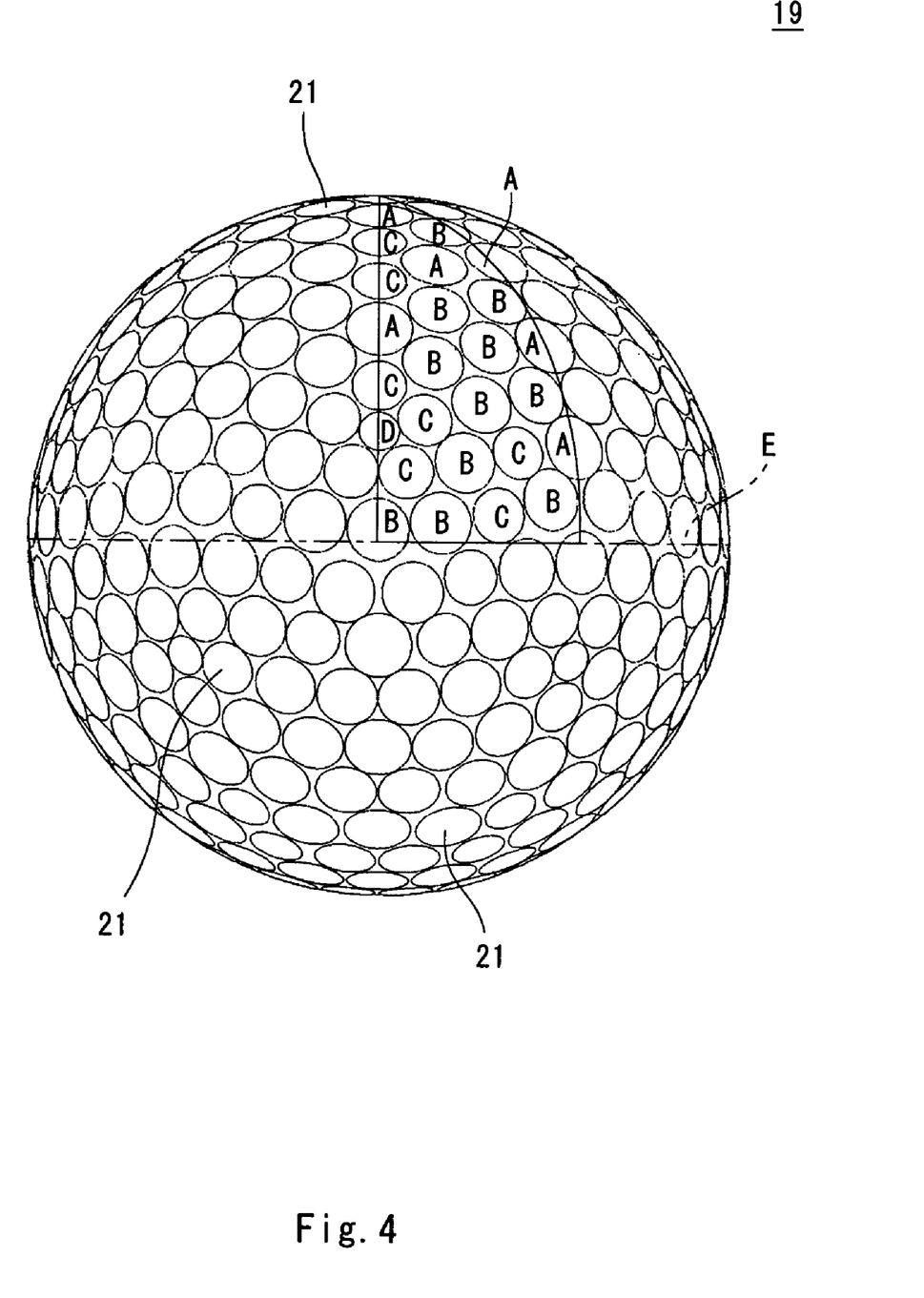
FIG. 4 is a front view showing a golf ball formed by the mold in FIG. 1.

FIG. 4 is a front view showing a golf ball 19 formed by the mold of FIG. 1. As is apparent from FIG. 4, the golf ball 19 has a large number of dimples 21 on a surface. All the dimples 21 are circular. In FIG. 4, the type of the dimple 21 is represented as A to D for one of 20 equivalent units obtained by comparting the surface of the golf ball 19.

Figure 5:
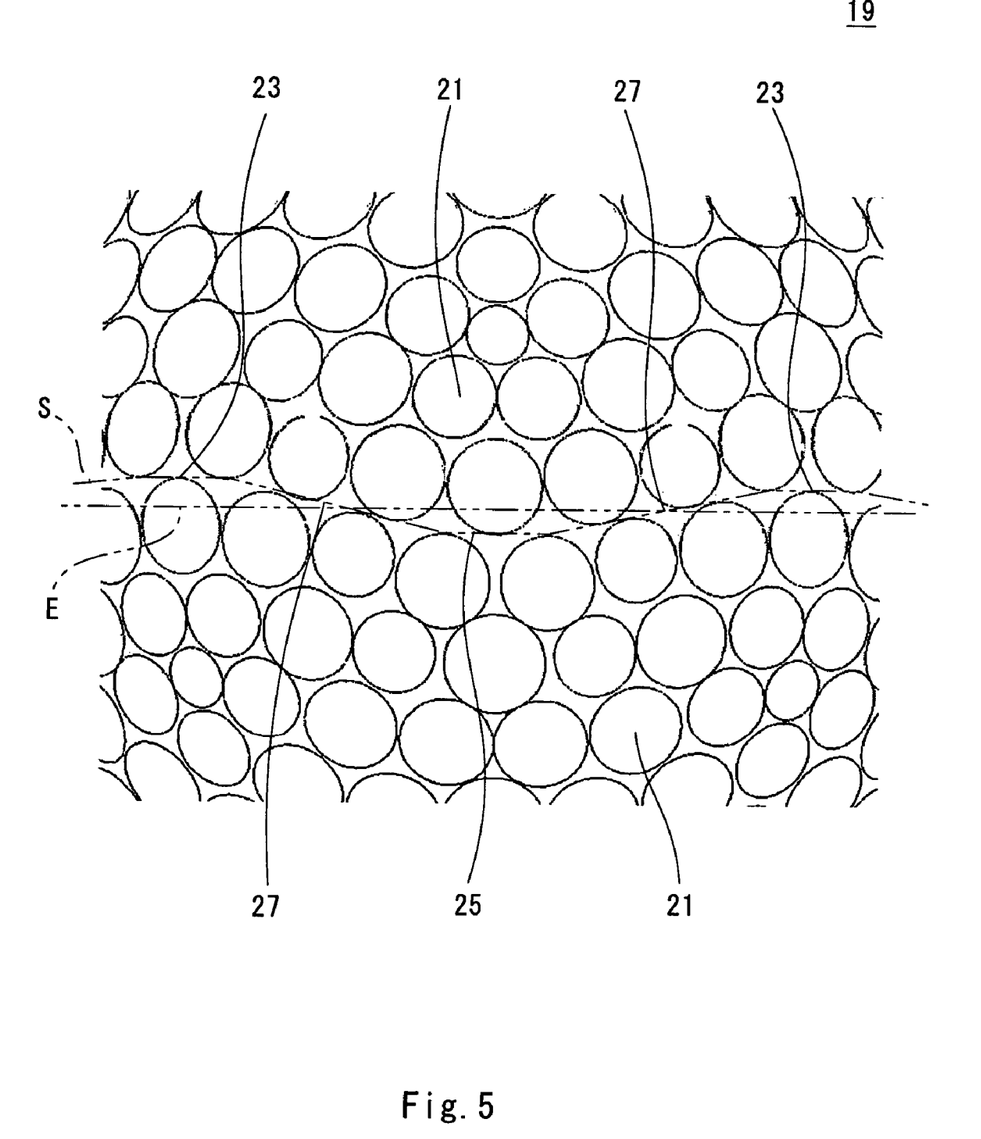
FIG. 5 is an enlarged front view showing a part of the golf ball in FIG. 4.

FIG. 5 is an enlarged front view showing a part of the golf ball 19 in FIG. 4. In FIG. 5, a seam S is shown in a two-dotted chain line. The seam S corresponds to the parting line of the mold. In the actual golf ball 19, the seam S is not recognized as an edge. The seam S does not cross the dimple 21. The seam S includes a first horizontal portion 23, a second horizontal portion 25 and an inclined portion 27. The first horizontal portion 23 corresponds to the first horizontal plane 13, the second horizontal portion 25 corresponds to the second horizontal plane 15, and the inclined portion 27 corresponds to the inclined surface 17.

As shown in FIG. 5, the seam S is concavo-convex shaped. In other words, the seam S is not a great circle. A great circle path is not present on the equator of the golf ball 19. In the golf ball 19, a great dimple effect can be produced when the highest speed portion of a back spin is coincident with the equator E. The golf ball 19 is excellent in an aerodynamical symmetry. As is apparent from FIG. 4, the great circle path is not present in a region other than the equator E of the golf ball 19. The golf ball 19 has no great circle path. The golf ball 19 is excellent in a flight performance.

A circumferential central angle of one first horizontal plane 13 is shown in an arrow $\phi$ of FIG. 3. The circumferential central angle $\phi$ is measured on a boundary line between the cavity surface 5 and the parting surface 8. The circumferential central angle $\phi$ of the second horizontal plane 15 is also measured in the same manner. The circumferential central angle $\phi$ is measured in 10 places in total, that is, five first horizontal planes 13 and five second horizontal planes 15, and their total value $\Sigma\phi$ is calculated. The total value $\Sigma\phi$ is 30 degrees to 330 degrees. If the total value $\Sigma\phi$ is less than the range, a mold clamping pressure applied to the inclined surface 17 is increased so that wear-out is apt to be caused. From this viewpoint, the total value $\Sigma\phi$ is more preferably 60 degrees or more and particularly preferably 108 degrees or more. If the total value $\Sigma\phi$ is more than the range, a smooth portion generated along the first horizontal portion 23 and the second horizontal portion 25 becomes longer by the removal of a spew. In some cases in which the equator E becomes the highest speed portion of the backs pin, further more, a dimple effect is reduced. From this viewpoint, the total value $\Sigma\phi$ is more preferably 300 degrees or less and particularly preferably 252 degrees or less.

It is preferable that each circumferential central angle $\phi$ should be 55 degrees or less. If the circumferential central angle $\phi$ is more than the range, a smooth portion generated along the first horizontal portion 23 and the second horizontal portion 25 becomes longer by the removal of a spew. In some cases in which the equator E becomes the highest speed portion of the backs pin, furthermore, the dimple effect is reduced. From this viewpoint, the circumferential central angle $\phi$ is more preferably 50 degrees or less and particularly preferably 42 degrees or less.

Figure 6:
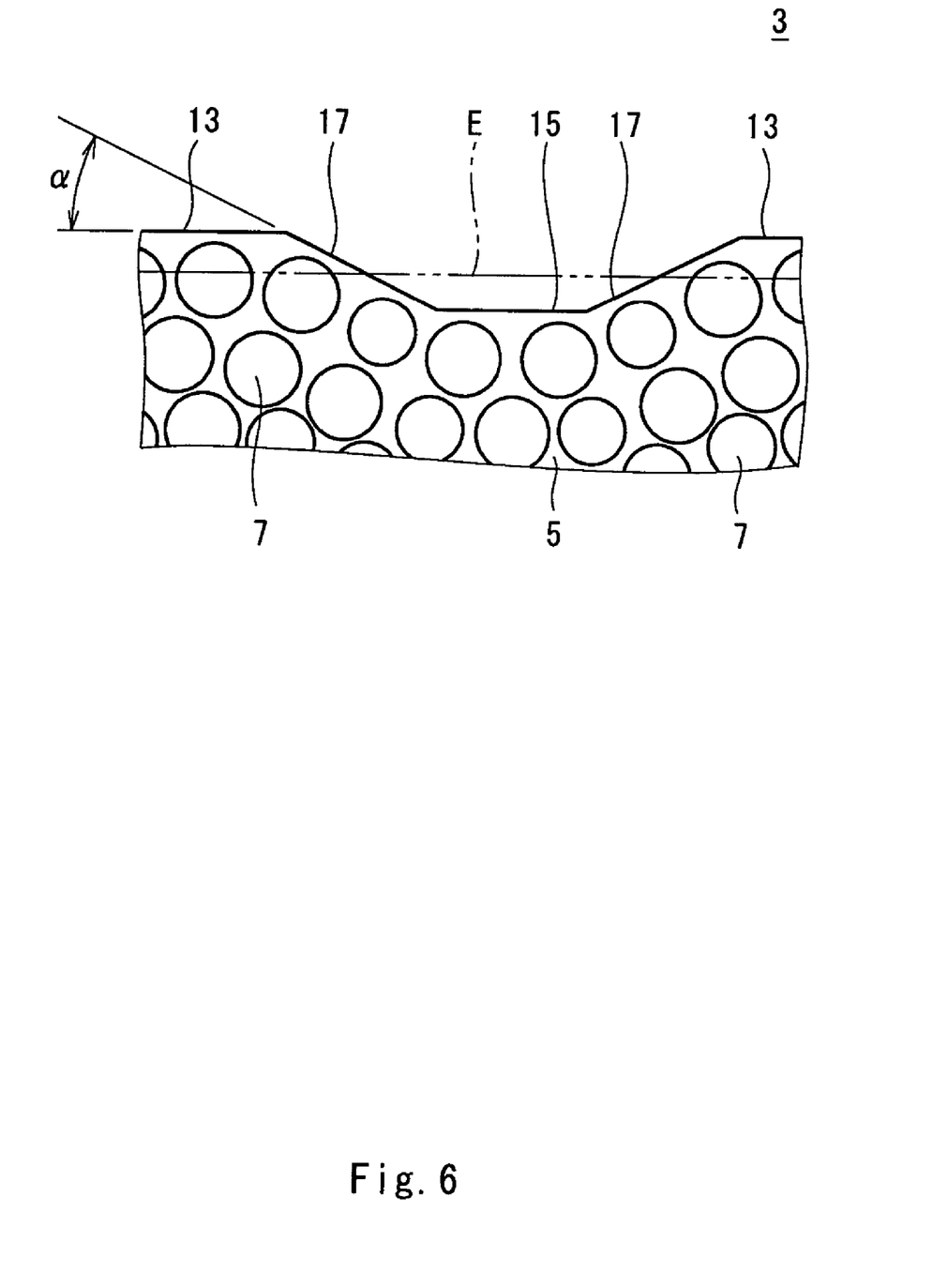
FIG. 6 is an enlarged view showing a part of the lower portion in FIG. 2.

FIG. 6 is an enlarged view showing a part of the lower portion 3 in FIG. 2. FIG. 6 shows the cavity surface 5. An angle in a horizontal direction of the inclined surface 17 is shown in an arrow $\alpha$ of FIG. 6. The angle of the inclined surface 17 is measured on the boundary line between the cavity surface 5 and the parting surface 8.

The inclination angle $\alpha$ is 10 degrees to 60 degrees. If the inclination angle $\alpha$ is less than the range, a distance between the horizontal portions 23 and 25 and the equator E is reduced. In some cases in which the highest speed portion of the back spin is coincident with the equator E, consequently, the dimple effect becomes insufficient. From this viewpoint, the inclination angle $\alpha$ is more preferably 14 degrees or more and particularly preferably 16 degrees or more. If the inclination angle $\alpha$ is more than the range, there is a possibility that the boundary between the inclined surface 17 and the horizontal planes 13 and 15 might be worn out. From this viewpoint, the inclination angle $\alpha$ is more preferably 40 degrees or less and particularly preferably 30 degrees or less.

In the case in which the inclined surface 17 is curved, an angle in a horizontal direction of a straight line passing through a boundary point between the inclined surface 17 and the first horizontal plane 13 and a boundary point between the inclined surface 17 and the second horizontal plane 15 is measured to be $\alpha$. In the case in which the inclined surface 17 is curved, it is preferable that the following expression (I) should be formed in all the portions of the inclined surface 17.

$$0.7 \cdot \alpha < \alpha' < 1.3 \cdot \alpha \qquad (I)$$

In the expression, $\alpha'$ is an angle formed in the horizontal direction by a tangential line to the inclined surface 17 in a certain portion of the inclined surface 17.

Figure 7:
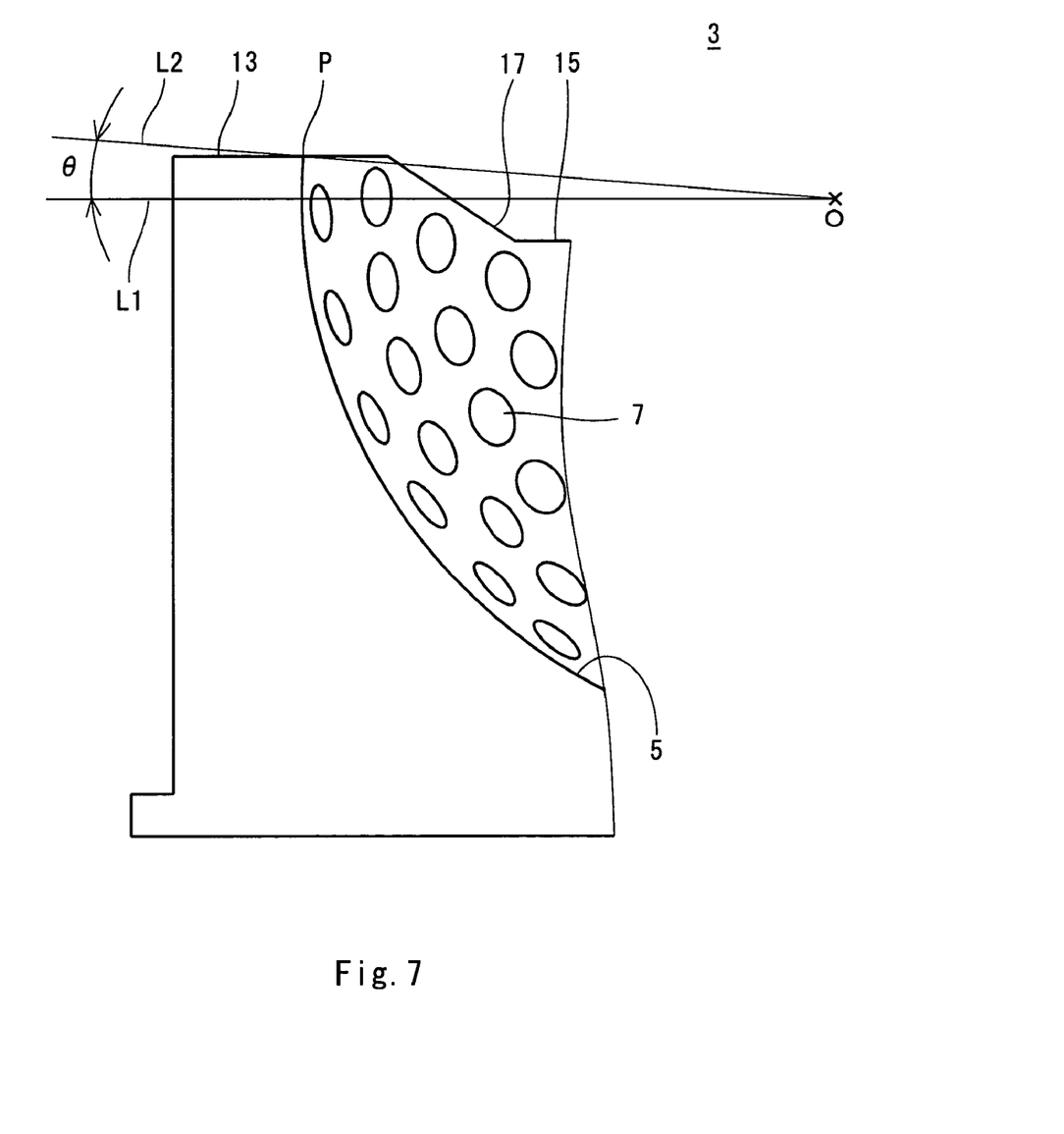
FIG. 7 is an enlarged sectional view showing a part of the lower portion in FIG. 2.

FIG. 7 is an enlarged sectional view showing a part of the lower portion 3 in FIG. 2. In FIG. 7, L1 denotes a straight line drawn from the center O of the sphere in the horizontal direction. The straight line L1 passes through the equator E. In FIG. 7, P denotes a boundary between the first horizontal plane 13 and the cavity surface 5. In FIG. 7, L2 denotes a straight line passing through the center O of the sphere and the point P. In FIG. 7, $\theta$ denotes an angle formed by the straight lines L1 and L2, that is, a central angle between the first horizontal plane 13 and the equator E. The central angle $\theta$ between the second horizontal plane 15 and the equator E is also measured by the same method, which is not shown.

It is preferable that the central angle $\theta$ should be 1 degree to 8 degrees. If the central angle $\theta$ is less than the range, the distance between the horizontal portions 23 and 25 and the equator E is reduced. In some cases in which the highest speed portion of the back spin is coincident with the equator E, consequently, the dimple effect becomes insufficient. From this viewpoint, the central angle $\theta$ is more preferably 1.5 degrees or more and particularly preferably 2 degrees or more. If the central angle $\theta$ is more than the range, there is a possibility that the boundary between the inclined surface 17 and the horizontal planes 13 and 15 might be worn out. From this viewpoint, the central angle $\theta$ is more preferably 7 degrees or less and particularly preferably 6 degrees or less.

It is preferable that the boundary corner portion between the first horizontal plane 13 and the inclined surface 17 and the boundary corner portion between the second horizontal portion 15 and the inclined surface 17 should be subjected to rounding. By the rounding, the wear-out of the boundary corner portions can be suppressed. A mold subjected to the rounding is excellent in a durability. R of the rounding is preferably 0.5 mm to 7.0 mm and particularly preferably 1.0 mm to 5.0 mm.

It is preferable that the number of the horizontal planes 13 and 15 should be 4 to 12 (which is the sum of the numbers of the first horizontal plane 13 and the second horizontal plane 15 and is also the number of the inclined surfaces 17). If the number is less than the range, the smooth portion generated along the first horizontal portion 23 and the second horizontal portion 25 becomes longer by the removal of a spew. In some cases in which the equator E becomes the highest speed portion of the backs pin, furthermore, the dimple effect is reduced. From this viewpoint, it is particularly preferable that the number is 6 or more. If the number is more than the range, a time and labor is required for manufacturing the mold. From this viewpoint, it is particularly preferable that the number is 10 or less.

It is preferable that a space between the inclined surface 17 of the upper portion 1 and the inclined surface 17 of the lower portion 3 should be 1 μm to 100 μm in a stage in which the mold is clamped so that a material is pressurized. In some cases in which the space is less than the range, the durability of the mold becomes insufficient. From this viewpoint, it is more preferable that the space should be 5 μm or more and particularly preferable 10 μm or more. If the space is more than the range, a spew having a great thickness is generated so that the area of the smooth portion is increased. From this viewpoint, the space is more preferably 95 μm or less and particularly preferably 90 μm or less.

For molding the golf ball 19 shown in FIG. 4, an injection molding method is usually employed. In the injection molding method, first of all, a core is put in a mold. Next, the mold is clamped. The core is held at the center of a spherical cavity with a holding pin which is not shown. Then, a molten material (usually, a synthetic resin) is injected between the core and the cavity surface 5 through a gate which is not shown. The molten synthetic resin is solidified so that a cover is formed. At the same time, the dimple 21 having a shape obtained by inverting the shape of the projection 7 is formed.

The golf ball 19 may be formed by a compression molding method. In the compression molding method, first of all, the core is covered by two half shells. Next, the core and the half shells are put in the mold. Then, the mold is clamped and the half shell is pressurized and heated. The half shell flows so that the cover is formed. At the same time, the dimple 21 having a shape obtained by inverting the shape of the projection 7 is formed.

In case of the injection molding method and the compression molding method, the material slightly leaks out at the parting surface 8. Consequently, a concavo-convex spew is generated on the seam S of the golf ball 19. The spew is removed by grinding. The dimple 21 is not formed on the seam S in order to easily remove the spew. Since the mold having the parting surface 8 which is concavo-convex shaped is used, however, the golf ball 19 does not have the great circle path.

EXAMPLES

Example 1

A mold including upper and lower portions was prepared, each of the upper and lower portions having five first horizontal planes, five second horizontal planes and ten inclined surfaces. Circumferential central angles φ of the first horizontal plane and the second horizontal plane are 10.54 degrees, an inclination angle α of the inclined surface is 12.0 degrees, and a central angle θ of the inclined surface is 2.7 degrees. A core formed of a solid rubber was put in the mold and an ionomer resin composition was injected around the core through a gate, and a cover was thus formed. A dimple was formed simultaneously with the formation of the cover, and a spew was generated. The spew was ground and removed by means of a rotary grindstone. The surface of the cover was subjected to coating. Thus, the golf ball shown in FIGS. 4 and 5 was obtained. The golf ball had a diameter of approximately 42.7 mm. A compression of the golf ball measured by means of an ATTI compression tester manufactured by Atti Engineering Co., Ltd. was approximately 85. The total number of the dimples of the golf ball was 420 and the total volume of the dimples (the sum of the volumes of portions surrounded by a plane including the contours of the dimples and the surfaces of the dimples) was approximately 320 mm$^3$. The golf ball does not have a great circle path.

Examples 2–3 and Comparative Examples 1–2

A golf ball was obtained in the same manner as that in the example 1 except that a mold was changed. The details of the mold are shown in the following Table 1.

Comparative Example 3

A golf ball was obtained in the same manner as that in the example 1 except that a mold having a parting surface to be flat was used. The seam of the golf ball is a great circle path.

[Flight Distance Test]

A driver (W#1) having a metal head attached thereto was fixed to a swing robot produced by True Temper Co. The golf ball was hit at a head speed of 49 m/s and a flight distance (a distance from a launch point to a drop point) was measured. The measurement was carried out by pole hitting (a hitting method in which a longitudinal line becomes the highest speed portion of a back spin) and seam hitting (a hitting method in which an equator E becomes the highest speed portion of the back spin). In the evaluation, a launch angle was approximately 11 degrees and a back spin speed was approximately 3000 rpm. Moreover, an almost following wind blew during the evaluation and a mean wind speed was approximately 1 m/s. The mean value of 20 data is shown in the following Table 1.

TABLE 1

Result of Evaluation

Figure 8:
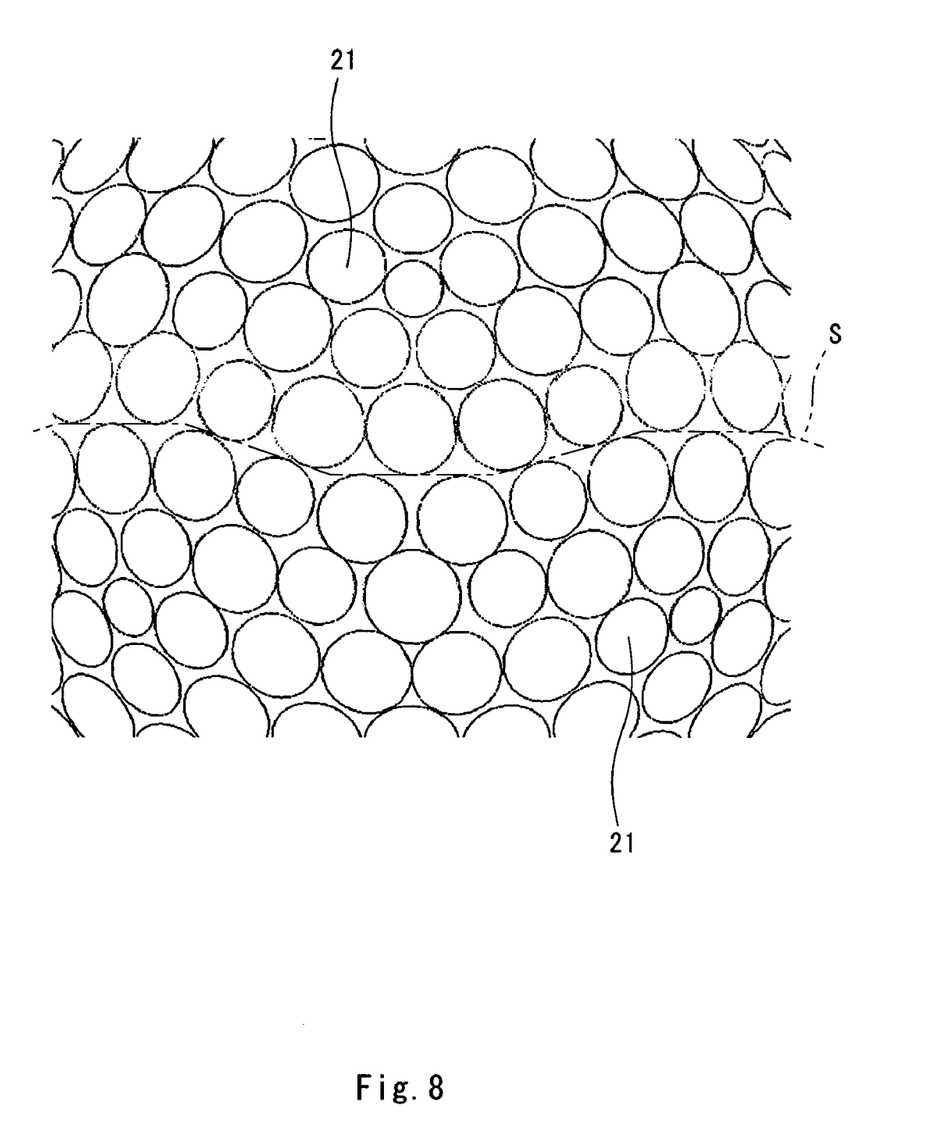
FIG. 8 is a front view showing a part of a golf ball according to an example 2 of the present invention.
Figure 9:
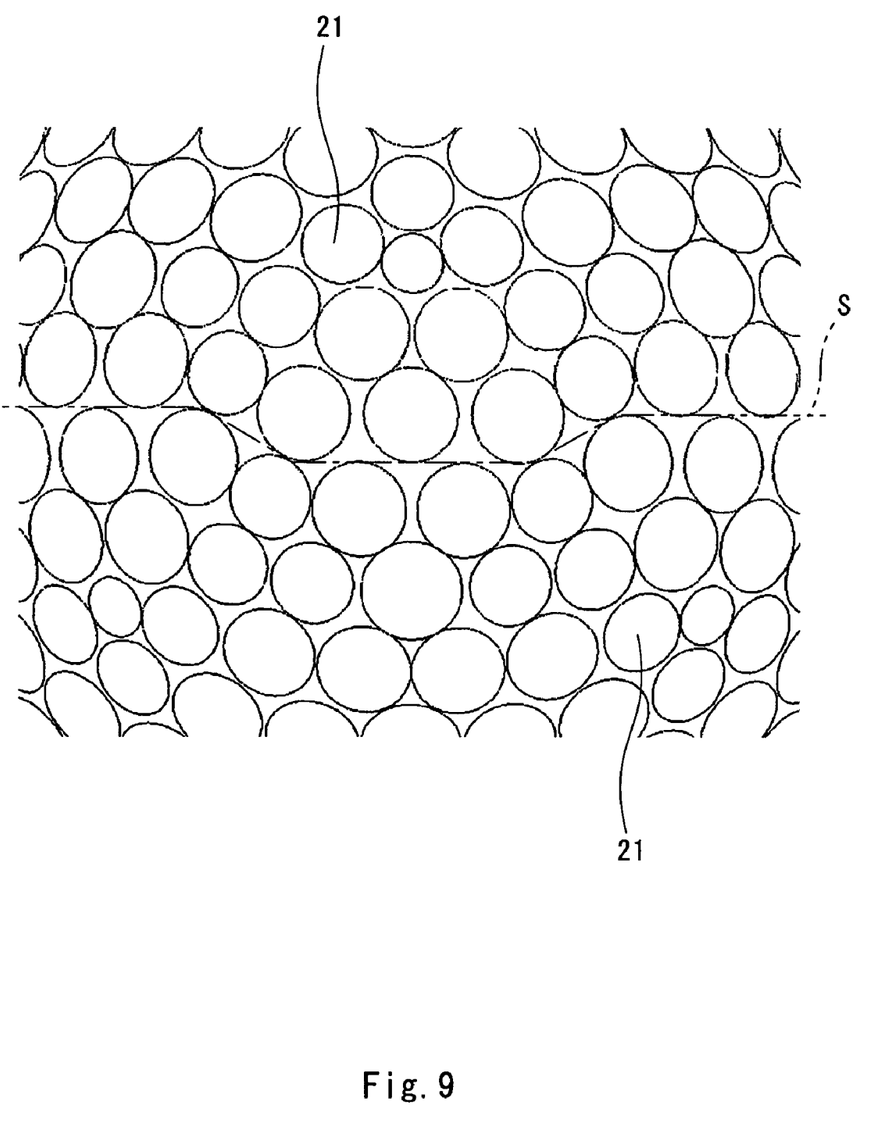
FIG. 9 is a front view showing a part of a golf ball according to an example 3 of the present invention.
Figure 10:
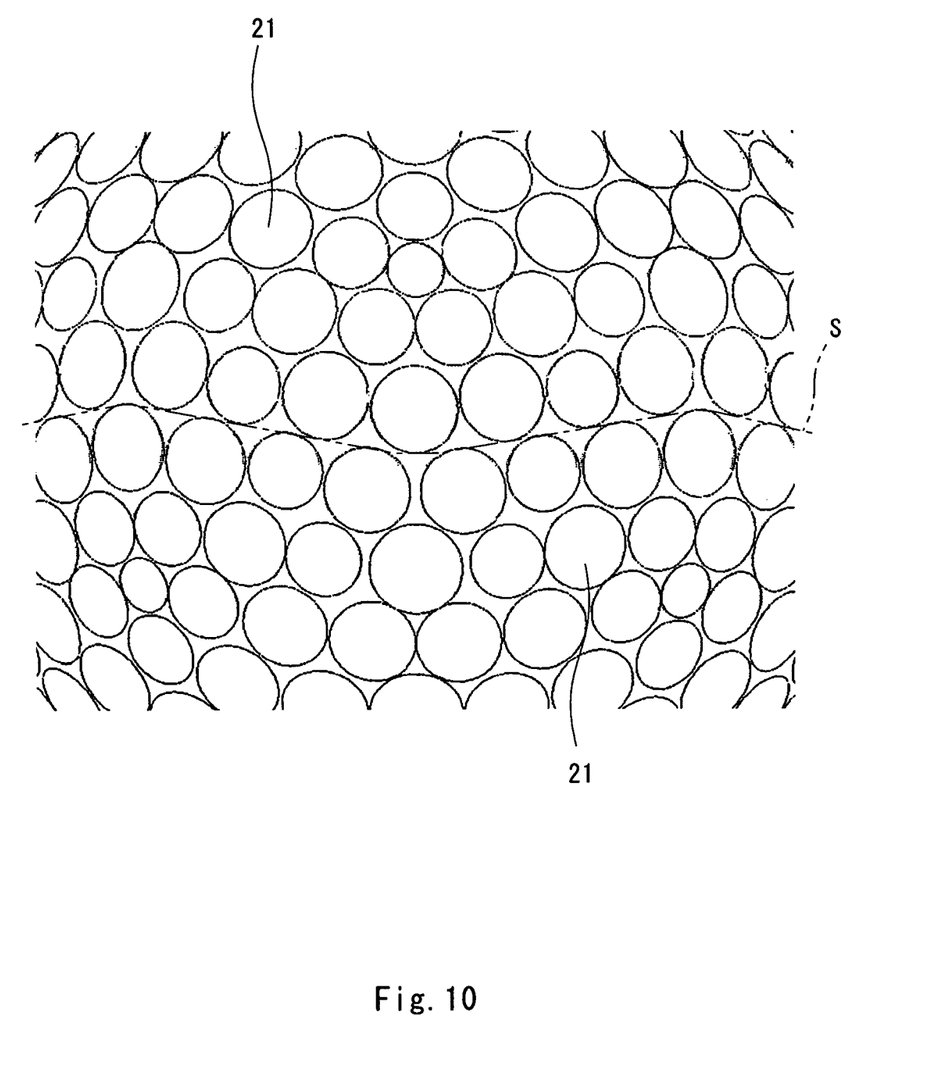
FIG. 10 is a front view showing a part of a golf ball according to a comparative example 1 of the present invention.
Figure 11:
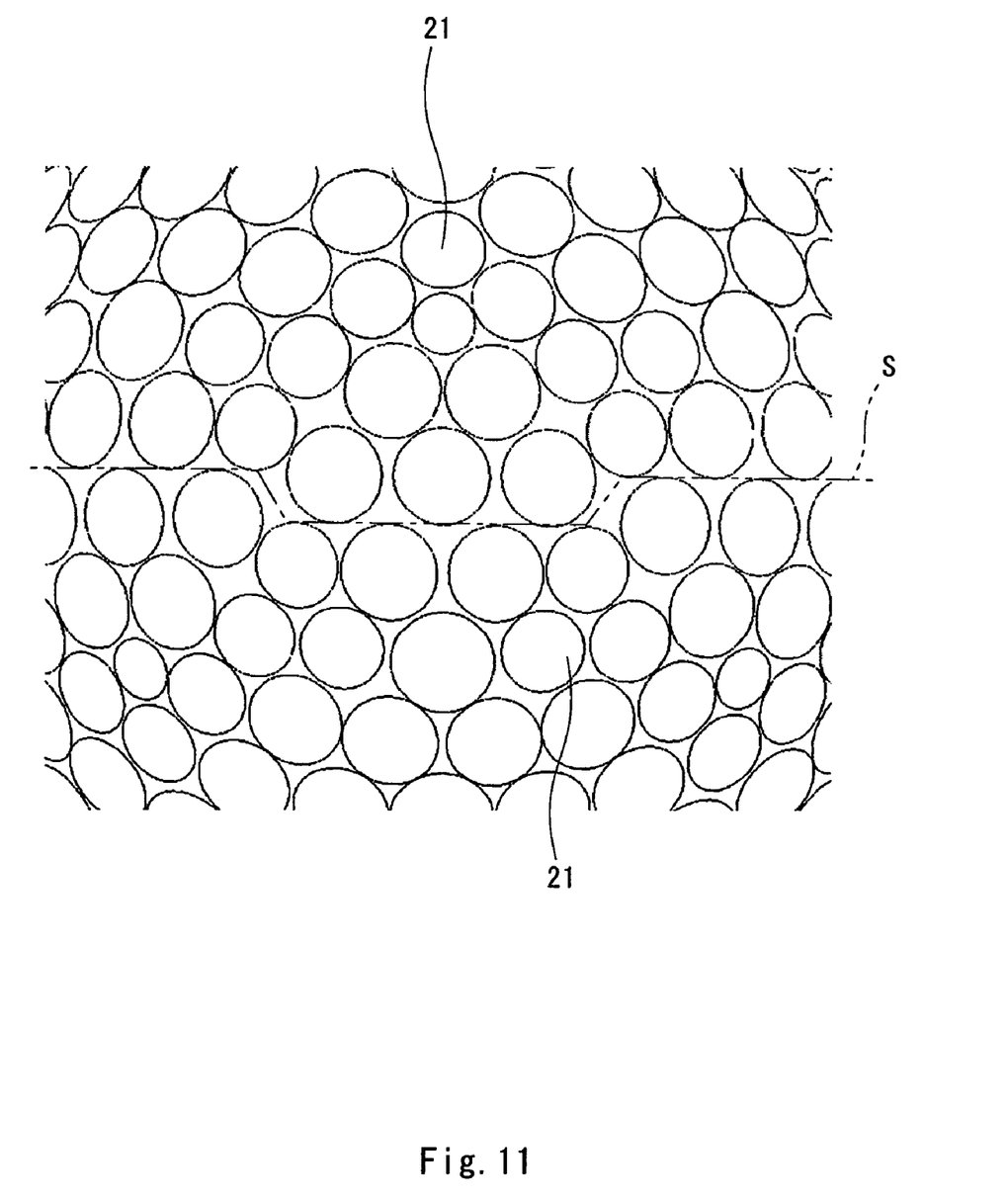
FIG. 11 is a front view showing a part of a golf ball according to a comparative example 2 of the present invention.
Figure 12:
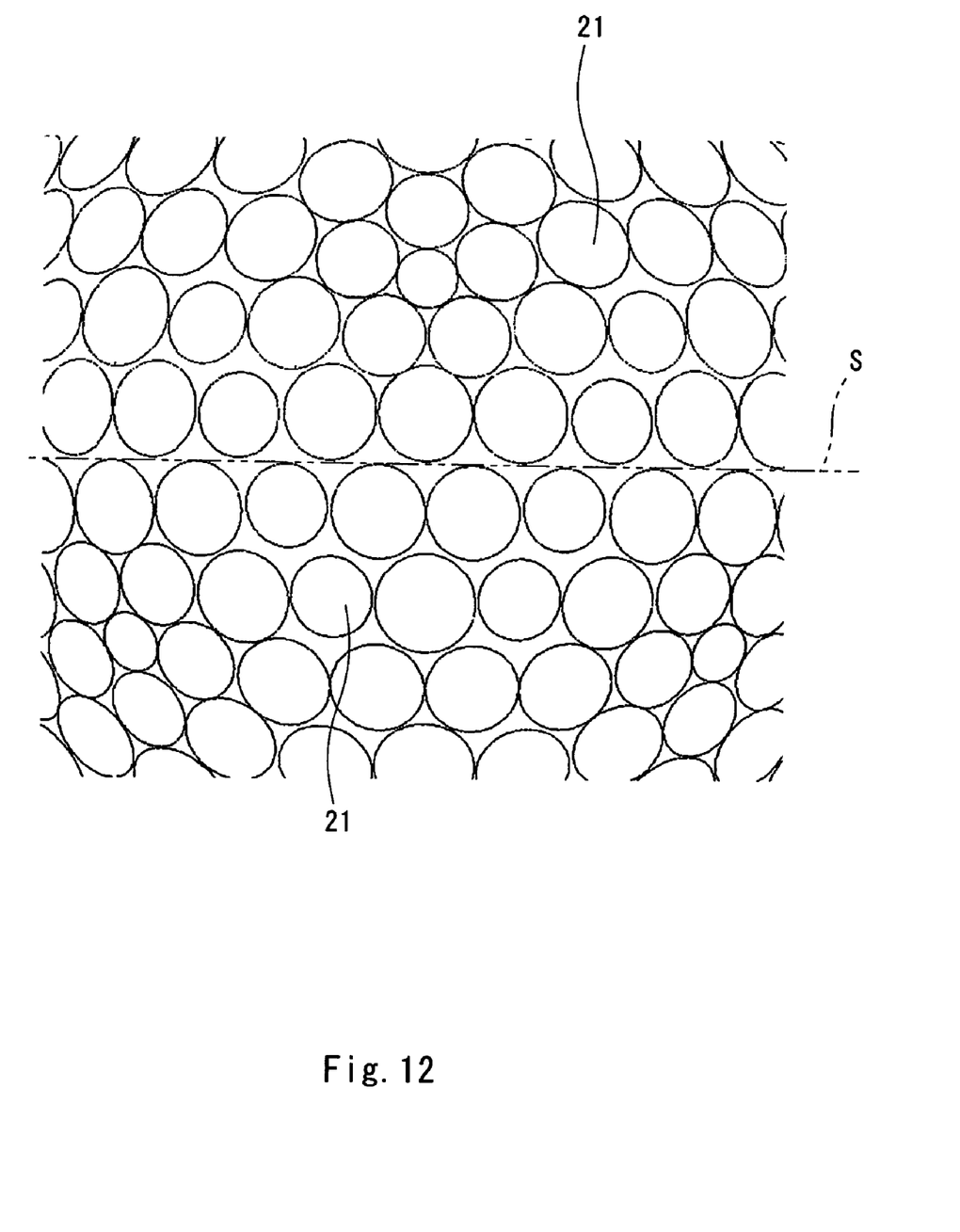
FIG. 12 is a front view showing a part of a golf ball according to a comparative example 3 of the present invention.

|  | Example 1 | Example 2 | Example 3 | Com. example 1 | Com. example 2 | Com. example 3 |
|---|---|---|---|---|---|---|
| Parting surface | Concave-convex | Concave-convex | Concave-convex | Concave-convex | Concave-convex | Flat |
| Number of first horizontal planes | 5 | 5 | 5 | 5 | 5 | — |
| Number of second horizontal planes | 5 | 5 | 5 | 5 | 5 | — |
| Number of inclined surfaces | 10 | 10 | 10 | 10 | 10 | — |
| Circumferential central angle φ (degree) | 10.54 | 19.42 | 25.85 | 1.58 | 33.15 | — |
| Total value Σ φ (degree) | 105.4 | 194.2 | 258.5 | 15.8 | 331.5 | — |
| Inclination angle α (degree) | 12.0 | 18.0 | 28.0 | 9.0 | 62.0 | — |
| Central angle θ (degree) | 2.7 | 2.7 | 2.7 | 2.7 | 2.7 | — |
| Drawing of golf ball | FIG. 4 FIG. 5 | FIG. 8 | FIG. 9 | FIG. 10 | FIG. 11 | FIG. 12 |

TABLE 1-continued

| | Result of Evaluation | | | | | |
|---|---|---|---|---|---|---|
| | Example 1 | Example 2 | Example 3 | Com. example 1 | Com. example 2 | Com. example 3 |
| Number of great circle paths of golf ball | 0 | 0 | 0 | 0 | 0 | 1 |
| Flight distance | | | | | | |
| Pole hitting (m) | 231.9 | 232.4 | 232.0 | 231.6 | 231.2 | 230.7 |
| Seam hitting (m) | 231.1 | 231.8 | 231.3 | 230.3 | 229.8 | 229.1 |
| Difference (m) | 0.8 | 0.6 | 0.7 | 1.3 | 1.4 | 1.6 |

As shown in the Table 1, the golf balls according to the examples have smaller differences in a flight distance depending on the position of the highest speed portion than those of the golf balls according to the comparative examples. Furthermore, the golf balls according to the examples have greater flight distances than those of the golf balls according to the comparative examples. From the result of the evaluation, the advantage of the present invention is apparent.

The above description is only illustrative and various changes can be made without departing from the scope of the present invention.

What is claimed is:

1. A mold for a golf ball comprising upper and lower portions having a large number of projections for dimple formation on cavity surfaces thereof,
   wherein parts of the projections cross an equator,
   each of the upper and lower portions has a plurality of horizontal planes and a plurality of inclined surfaces on a parting surface,
   a total value $\Sigma\phi$ of circumferential central angles $\phi$ of the horizontal planes is 30 degrees to 252 degrees, and
   an inclination angle $\alpha$ of the inclined surface to a horizontal direction is 10 degrees to 60 degrees.

2. The mold according to claim 1, wherein each of the circumferential central angles $\phi$ of the horizontal planes is 55 degrees or less.

3. The mold according to claim 1, wherein a central angle $\theta$ between the horizontal plane and the equator is 1 degree to 8 degrees.

4. The mold according to claim 1, wherein a boundary corner portion between the horizontal plane and the inclined surface is subjected to rounding.

5. A method of manufacturing a golf ball, comprising the steps of:
   putting a material in a mold which includes upper and lower portions having a large number of projections on cavity surfaces thereof, each of the upper and lower portions having a plurality of horizontal planes and a plurality of inclined surfaces on a parting surface thereof, a sum $\Sigma\phi$ circumferential central angles $\phi$ of the horizontal planes being 30 degrees to 252 degrees, and an inclination angle $\alpha$ of the inclined surface to a horizontal direction being 10 degrees to 60 degrees;
   forming a dimple having a shape obtained by inverting a shape of the projection through the projection; and grinding and removing a spew formed by a material leaking out at the parting surface.

6. The mold according to claim 1, wherein the total value $\Sigma\phi$ is 30 degrees to 194.2 degrees.

* * * * *